(12) United States Patent
Dower (10) Patent No.: US 8,005,588 B2
(45) Date of Patent: Aug. 23, 2011

(54) VEHICLE POWER AND SPEED CONTROL SYSTEMS (76) Inventor: Gordon Ewbank Dower, Point Roberts, WA (US)

( * ) Notice: Subject to any disclaimer, the term of this patent is extended or adjusted under 35 U.S.C. 154(b) by 115 days.

(21) Appl. No.: 12/449,170

(22) PCT Filed: Jan. 29, 2008

(86) PCT No.: PCT/CA2008/000216
§ 371 (c)(1),
(2), (4) Date: Jul. 27, 2009

(87) PCT Pub. No.: WO2008/092274
PCT Pub. Date: Aug. 7, 2008

(65) Prior Publication Data
US 2010/0087975 A1    Apr. 8, 2010

Related U.S. Application Data (60) Provisional application No. 60/898,104, filed on Jan. 30, 2007.

(51) Int. Cl.
*G06F 19/00* (2006.01)
*G05G 1/44* (2008.04)
(52) U.S. Cl. .............................. 701/22; 74/514; 180/65.1
(58) Field of Classification Search ............ 701/22; 74/514; 180/65.1, 65.2, 65.3
See application file for complete search history.

(56) References Cited

U.S. PATENT DOCUMENTS

| | | | |
|---|---|---|---|
| 2,083,940 A | 6/1937 | Burton et al. | |
| 2,411,167 A | 11/1946 | Perry | |
| 2,968,967 A | 1/1961 | Ross | |
| 3,654,762 A | 4/1972 | Damon | |
| 3,939,726 A | 2/1976 | Ahrens | |
| 4,631,679 A | 12/1986 | Klatt | |
| 5,086,891 A | 2/1992 | Rinder | |
| 5,203,214 A | 4/1993 | Frisbee et al. | |
| 5,237,891 A | 8/1993 | Neubauer et al. | |
| 5,293,976 A * | 3/1994 | Naruse | 477/211 |
| 5,558,601 A * | 9/1996 | Naruse | 477/213 |
| 5,915,801 A * | 6/1999 | Taga et al. | 303/152 |
| 6,041,673 A | 3/2000 | Schmillen | |
| 6,070,680 A * | 6/2000 | Oyama | 180/65.25 |
| 6,101,896 A * | 8/2000 | Engelgau | 74/560 |
| 6,122,588 A * | 9/2000 | Shehan et al. | 701/93 |
| 6,192,860 B1 | 2/2001 | Hatlen | |
| 6,233,508 B1 * | 5/2001 | Deguchi et al. | 701/22 |

(Continued)

*Primary Examiner* — Thomas Black
*Assistant Examiner* — Wae Louie (57) ABSTRACT To control both acceleration and deceleration of vehicles having an electric drive with regenerative braking, there is disclosed a control actuator which is biased to a neutral position, and which is controllably moveable between opposed positive and negative control positions relative to the neutral position to produce a control signal ranging from a value corresponding to zero when in the neutral position to a positive or negative value dependent on the amount of movement from the neutral position. The actuator may comprise a rocking foot pedal which is rotationally biased to the neutral position and which is pivotable against the bias both clockwise and anticlockwise from the neutral position to a desired positive or negative power control position. In one system, the signal produced by the actuator is treated as a power control signal and is conditioned and used to control vehicle power (i.e. energy flow from the vehicle battery to the vehicle's electric drive). In another system, the signal produced by the actuator is treated as a speed changing control signal and is conditioned and used to control vehicle speed. Whatever desired speed is reached by movement of the actuator from its neutral position, the speed is sustained if the actuator is then permitted to return to its neutral position.

10 Claims, 4 Drawing Sheets

U.S. PATENT DOCUMENTS

| | | | |
|---|---|---|---|
| 6,269,895 B1 * | 8/2001 | Tanuguchi et al. | 180/65.25 |
| 6,278,915 B1 * | 8/2001 | Deguchi et al. | 701/22 |
| 6,445,982 B1 * | 9/2002 | Swales et al. | 701/22 |
| 6,470,256 B1 * | 10/2002 | Cikalo et al. | 701/93 |
| 6,546,327 B2 * | 4/2003 | Hattori et al. | 701/96 |
| 6,687,580 B2 * | 2/2004 | Suzuki et al. | 701/22 |
| 6,856,038 B2 * | 2/2005 | Rebsdorf et al. | 290/44 |
| 6,865,471 B2 * | 3/2005 | Konishi et al. | 701/93 |
| 7,095,191 B2 * | 8/2006 | Sakurai | 318/139 |
| 7,096,109 B2 * | 8/2006 | Tanimichi et al. | 701/96 |
| 7,124,792 B2 | 10/2006 | Palmer | |
| 7,181,991 B2 * | 2/2007 | Naruse | 74/512 |
| 7,758,467 B2 * | 7/2010 | Ashizawa et al. | 477/5 |
| 7,779,943 B2 * | 8/2010 | Seidel et al. | 180/65.29 |
| 2002/0019687 A1 * | 2/2002 | Suzuki et al. | 701/22 |
| 2002/0023793 A1 * | 2/2002 | Hattori et al. | 180/169 |
| 2010/0087975 A1 * | 4/2010 | Dower | 701/22 |
| 2010/0138117 A1 * | 6/2010 | Witte | 701/48 |

* cited by examiner

VEHICLE POWER AND SPEED CONTROL SYSTEMS

CROSS-REFERENCE TO RELATED APPLICATIONS

This application is related to U.S. provisional application No. 60/898,104 filed Jan. 30, 2007, entitled "Vehicle Power and Vehicle Speed Control Systems", naming Gordon E. Dower as the inventor. The contents of the provisional application are incorporated herein by reference in their entirety, and the benefit of the filing date of the provisional application is hereby claimed for all purposes that are legally served by such claim for the benefit of the filing date.

BACKGROUND OF THE INVENTION

The present invention relates to vehicle power control and vehicle speed control systems for vehicles which have an electric drive. The systems include cruise control systems. The vehicles include not only vehicles which are exclusively electric but also vehicles which are hybrid-electric.

In conventional vehicles, the so-called "accelerator pedal" controls power, not speed. If the vehicle includes cruise control to hold the speed of the vehicle constant, cruise control settings are typically determined independently of the position of the accelerator pedal. Commonly, cruise control is engaged by a "set" button pushed by the driver at the desired speed, and disengaged by the driver pressing the brake pedal. A "resume" button returns the vehicle to the set speed.

In some vehicles employing an electric drive (viz. those using an electric motor and an electric motor controller), regenerative braking may store kinetic energy in a battery that would otherwise dissipate as heat. Potential energy released when going downhill may likewise be stored to the battery. Regenerative braking may be initiated by pressing the brake pedal but it also may be activated by release of pressure on the so-called "accelerator pedal"—a somewhat confusing term in the present context, which is hereinafter avoided by instead using the term "power control pedal".

Figure 1:
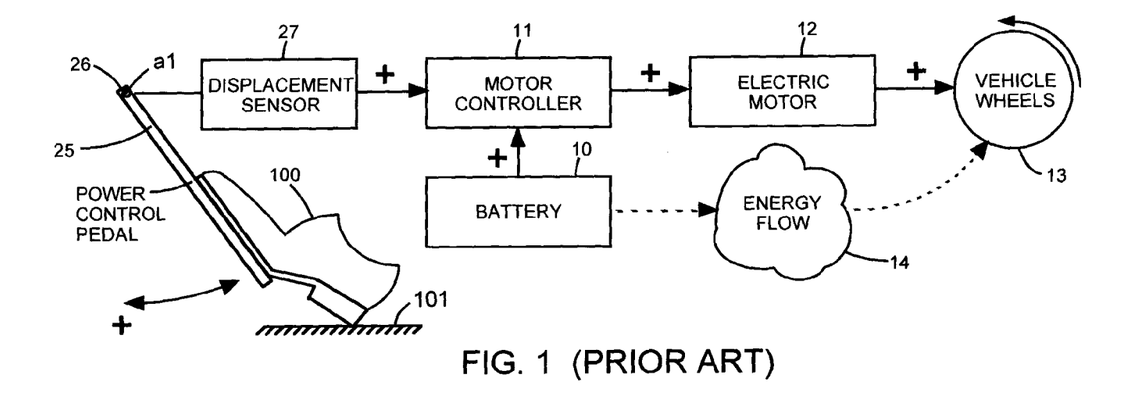
FIG. 1 is a diagrammatic representation of a prior art power control system for a vehicle which does not have regenerative braking.

In more detail, a basic prior art power control system for a vehicle having an electric drive is representationally illustrated in FIG. 1. A somewhat more advanced prior art system is representationally illustrated in FIG. 2. The fundamental difference between the two systems is that the system illustrated in FIG. 2 includes regenerative braking whereas the system illustrated in FIG. 1 does not.

The system shown in FIG. 1 derives power from a battery power source 10 and includes a motor controller 11 and an electric motor 12 for providing motive power to wheels 13 of a vehicle. The system shown in FIG. 2 similarly derives power from a battery power source 10 and includes a motor controller 21 and an electric motor 22 for providing motive power to wheels 13 of a vehicle. Both systems include a power control actuator comprising a power control pedal 25 and a displacement sensor 26 operatively connected to the power control pedal. In both cases, pedal 25 is mounted on a shaft 26.

In each system, pedal 25 is forcibly pivotable (clockwise from the position shown in FIGS. 1 and 2) about an upper horizontal axis a1 (which is also the axis of shaft 26) from a neutral or first pivot position where no power is to be applied to a second pivot position where maximum power is to be applied. The neutral position is maximally anticlockwise and the pedal is rotationally biased to that position by suitable biasing means (not shown). Normally, force is applied to the pedal by a user's foot 100 with the heel rested on floor 101 of the vehicle. When the force is released, then the pedal will return to its neutral position.

Figure 2:
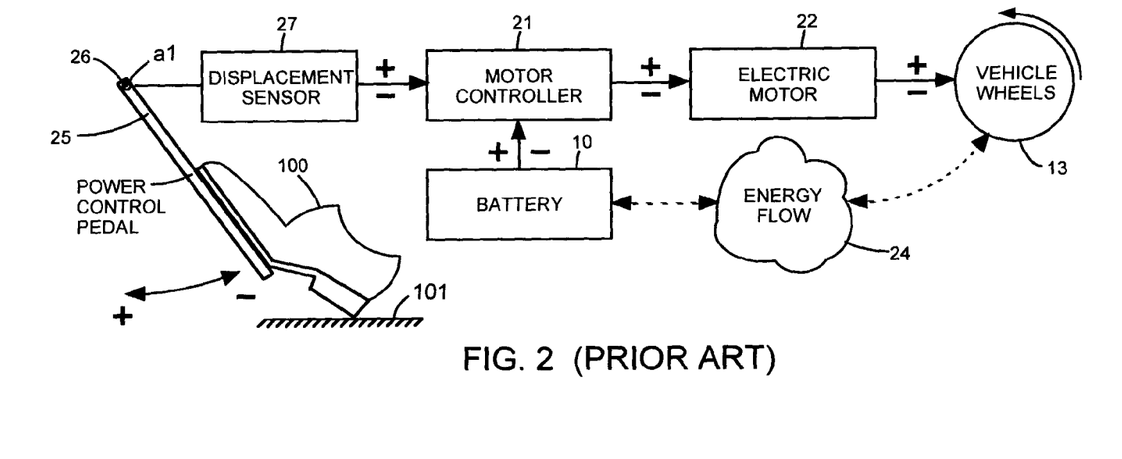
FIG. 2 is a diagrammatic representation of a prior art power control system for a vehicle which has regenerative braking.

In each system, a displacement sensor 27 produces a control signal having a variable value depending on the angular degree of rotation through which the pedal is pivoted clockwise from the neutral position. This signal is provided as an input to the motor controller (11, 21) which in response conditions and provides power from the battery (10, 20) to the electric motor (12, 22) depending on the measured angle.

In the case of the system illustrated in FIG. 1, power control pedal 25 regulates only positive power. Resulting energy flow as depicted by cloud 14 can occur in only one direction from battery 10 to vehicle wheels 13. In the case of the system illustrated in FIG. 2, power control pedal 25 may regulate negative as well as positive power. This is known as "single pedal control." Here, as depicted by cloud 24 in FIG. 2, energy may flow not only from battery 10 to wheels 13 as in the case of the system illustrated in FIG. 1, but also from wheels 13 to battery 10 when pressure on power control pedal 25 is released.

Power control pedals of the type described above are moveable in only one direction from their neutral position. Hence, they may be characterized as "unidirectional" in their operation. This limits their functionality.

A conventional power control pedal in a vehicle having an electric drive with regenerative braking will not allow the vehicle to coast or freewheel when the foot is removed from the pedal (unless regenerative braking under single pedal control is disabled). Yet freewheeling under such circumstances might be desired.

Also, a conventional power control pedal cannot be used to "set" a desired vehicle speed.

SUMMARY OF THE INVENTION

Accordingly, in one aspect of the present invention, there is provided a new and improved power control system for a vehicle having an electric drive with regenerative braking, the system comprising a power control actuator which is biased to a neutral position, and which is controllably moveable between positive and negative power control positions relative to the neutral position for producing a power control signal ranging from a value corresponding to zero power when in the neutral position to a variable value dependent on the amount of movement from the neutral position.

a power control actuator which is biased to a neutral position, and which is controllably moveable between positive and negative power control positions relative to the neutral position for producing a power control signal ranging from a value corresponding to zero power when in the neutral position to a variable value dependent on the amount of such movement from said neutral position.

To enable freewheeling rather than regenerative braking, the system preferably includes a speed sensor for providing a speed signal corresponding to the measured speed of the vehicle and a speed holder operably connected to the power control actuator and the speed sensor. The speed holder receives a signal corresponding to the power control signal as a first input signal and a signal corresponding to the speed signal as a second input signal. In response, the speed holder produces as an output signal a modified power control signal for the motor controller, the modified signal having a variable value dependent on the difference between the first and second input signals.

In a preferred embodiment, the power control actuator comprises a rocking foot pedal and a pedal rotation sensor, or an emulation of a rocking foot pedal and a pedal rotation sensor. The pedal is rotationally biased to a neutral position (e.g. by a suitable spring mechanism) relative to a pivot axis and is pivotable both clockwise and anticlockwise about the axis from the neutral position against the bias to a desired positive or negative power control position; a positive power control position normally being associated with acceleration and maintaining speed, a negative power control position normally being associated with braking. The rotation sensor is operatively connected to the pedal for producing the power control signal, the power control signal having a variable value dependent on the direction and degree of rotation of the pedal from its neutral position. When the pedal is in its neutral position, the power control actuator as a whole is in its neutral position.

The pedal rotation sensor may comprise various elements. For example, it may comprise a rotary potentiometer. As another example, it may comprise optical sensing means.

The orientation of the pivot axis about which rocking occurs is not considered to be critical. However, practical preferences may arise. Generally, it is contemplated that the pivot axis preferred by most users will be a horizontal axis typically located mid-way along the length of the pedal and extending transverse to the longitudinal alignment of the pedal. Normally, one's entire foot will be placed on the pedal.

In another aspect of the present invention, it is recognized that a rocking foot pedal or an emulation thereof may be used not only to regulate power but also to enable speed holding without the use of other means, such as set and resume buttons as in the case of conventional cruise control.

In this aspect of the invention, there is provided a vehicle speed control system for a vehicle having an electric drive with regenerative braking, the electric drive comprising an electric motor, an electric motor controller for controlling the motor, and a power source. The system comprises:
(a) a speed changing control actuator biased to a neutral position and controllably moveable between opposed positive and negative control positions relative to the neutral position for producing a speed changing control signal having a variable value dependent on the direction and amount of such movement;
(b) a braking actuator for producing a braking signal;
(c) a resettable integrator operably connected to the control actuator for receiving an input signal corresponding to the speed changing control signal and, in the absence of a braking signal, for providing an output signal related to the input signal and the time integral of the input signal;
(d) an integrator resetter for resetting the integrator in response to a braking signal; and,
(e) a speed sensor for providing a measured vehicle speed signal to said integrator.

In a preferred embodiment, the integrator is a switched augmenting integrator, the integrator resetter forming a part thereof.

In cases where the electric motor is a D.C. electric motor as opposed to an A.C. electric motor, the system additionally comprises a speed holder. Note that when an A.C. induction motor is used, a speed holder may not considered essential because the motor output will be a constant speed dependent on the voltage input frequency. Note also that whether the motor is D.C. or A.C. it may be a conventional motor.

The power source may be a conventional power source used for electric vehicles (for example, a conventional rechargeable battery). The electric motor controller may be a conventional motor controller for directing and conditioning power flowing between the power source and the motor in response to control signals which it (the motor controller) receives.

The foregoing and other features and advantages of the present invention will now be described with reference to the drawings.

DETAILED DESCRIPTION OF THE INVENTION

Figure 3:
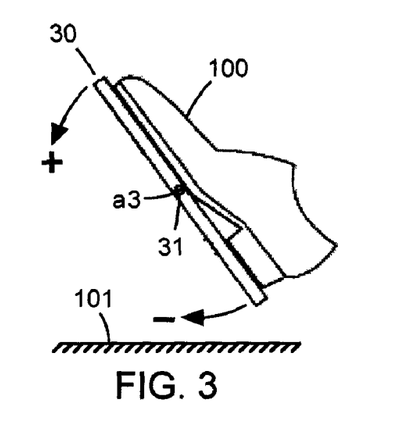
FIG. 3 is a diagrammatic representation in side elevation view of a rocking foot pedal and a user's foot.
Figure 4:
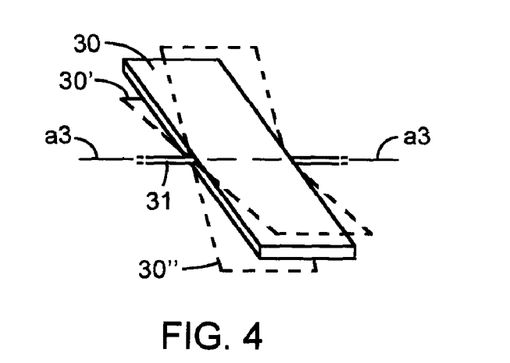
FIG. 4 is a perspective view of the rocking foot pedal shown in FIG. 3.
Figure 7:
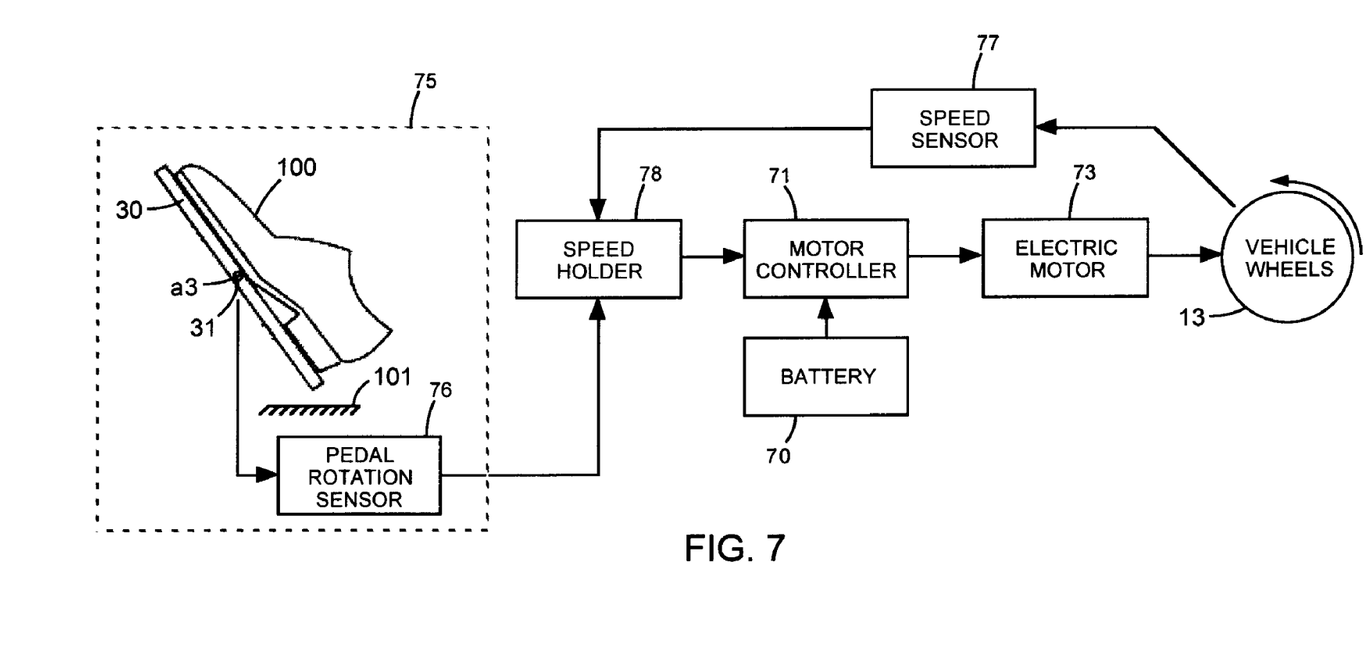
FIG. 7 is a diagrammatic representation of a power control system for a vehicle in accordance with the present invention.
Figure 8:
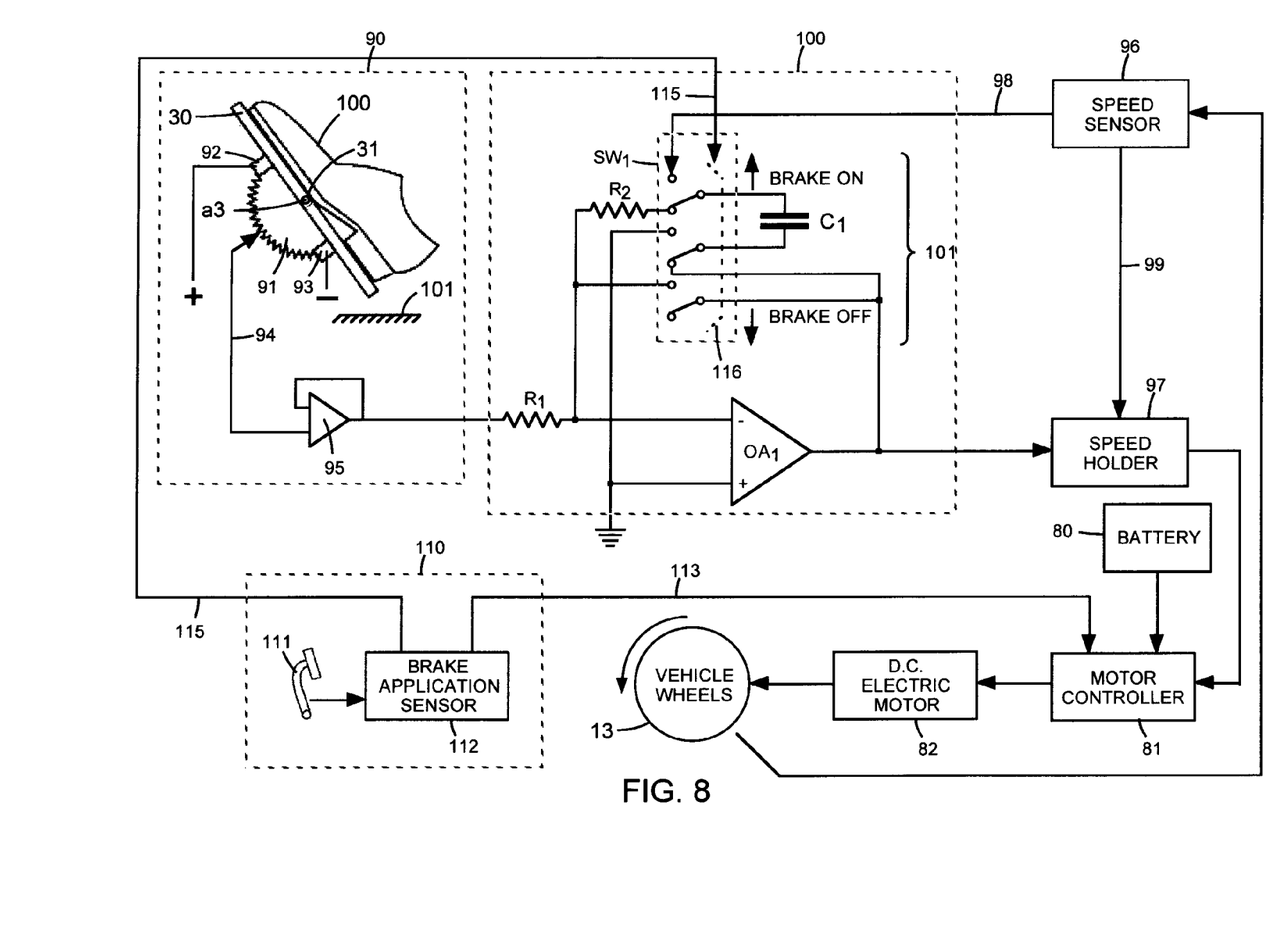
FIG. 8 is a diagrammatic representation of a vehicle speed control system in accordance with the present invention.

By way of introduction, both the embodiment shown in FIG. 7 and that shown in FIG. 8 include a rocking foot pedal 30 which is also illustrated in FIGS. 3 and 4. This pedal, mounted on a shaft 31, is pivotable both clockwise and anti-clockwise about axis a3 which extends transverse to the longitudinal axis of the pedal and generally horizontally relative to vehicle floor 101. The neutral or biased position of pedal 30 is shown in solid outline in both figures FIGS. 3 and 4. FIG. 4 additionally shows in broken outline the upper perimeter of pedal 30 when rotated anticlockwise to a position 30' from the neutral position. As well, FIG. 4 shows, again in broken outline, the upper perimeter of pedal 30 when rotated clockwise to a position 30" from the neutral position.

As represented by the plus sign in FIG. 3, positive power control positions will result from pushing with foot 100 on pedal 30 above axis a3 (normally with the forward portion of one's foot). As represented by the minus sign in FIG. 3, negative power control positions will result from pushing on the pedal below axis a3 (normally with the rearward portion of one's foot). Of course, it will be understood that such control characteristics could be reversed. However, it is considered that such a reversal would be counter-intuitive from a user's point of view. Unlike the foot position for control of pedal 25 as illustrated in FIGS. 1 and 2, the foot position for control of pedal 30 as illustrated in FIG. 3 normally will lie entirely on the pedal and above vehicle floor 101.

Figure 5:
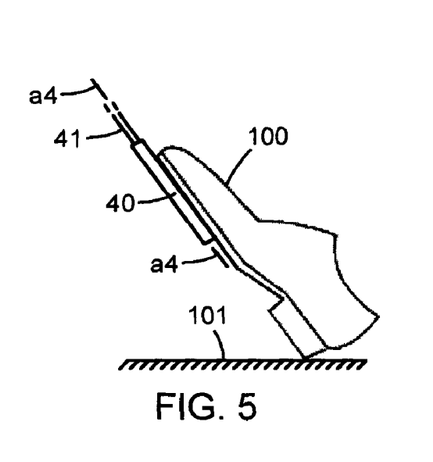
FIG. 5 is a diagrammatic representation in side elevation view of another rocking foot pedal and a user's foot.
Figure 6:
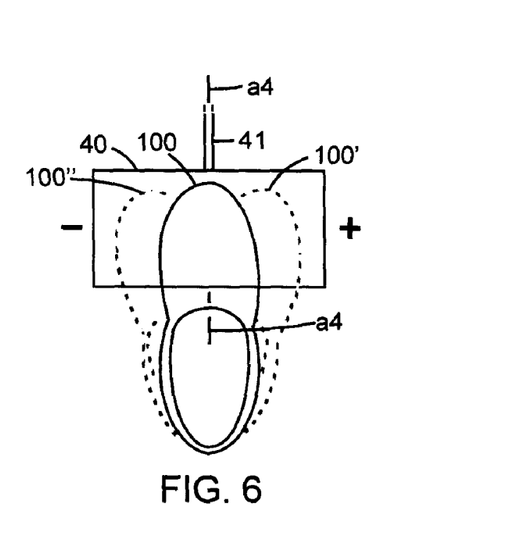
FIG. 6 is a top view of the rocking foot pedal and user's foot shown in FIG. 5.

As one alternative to a rocking foot pedal with a horizontally extending pivot axis a3 as described above, the pivot axis may be aligned to extend upwardly and forwardly relative to a vehicle floor. This alternative is illustrated in FIG. 5 which representationally shows a side elevation view of a rocking foot pedal 40 and a user's foot 100, the pedal being mounted on a shaft 41 and rotationally biased to the position shown in FIG. 5. The forward portion of the user's foot is rested on the pedal while the heel is rested on vehicle floor 101. Pedal 40 is pivotable both clockwise and anticlockwise from the neutral position shown in FIG. 5 about axis a4 which extends upwardly and forwardly relative to floor 101. A top view of pedal 40 illustrating in solid outline the forward portion of the user's foot 100 centrally positioned on the pedal is shown in FIG. 6. In this foot position, and without rotative pressure on either side of axis a4, pedal 40 remains in its neutral position.

Control may be achieved by placing the forward portion of one's foot on pedal 40 in a position bridging axis a4 while the heel is rested on the vehicle floor 101, then turning the foot to the left or right while pressing on the pedal. A foot turn to the right is illustrated in broken outline at 100' in FIG. 6. A foot turn to the left is illustrated in broken outline at 100". As indicated by the plus sign in FIG. 6, positive power control positions preferably are associated with foot turns to the right; negative power control positions preferably are associated with foot turns to the left. Although this control could be reversed, it is considered intuitively preferable because the left side of pedal 40 will be in closest proximity to where a conventional brake pedal is typically located relative to a conventional accelerator pedal.

Persons wearing high heels may find it awkward to place their entire foot on a rocking foot pedal such as pedal 30, and may therefore favor a pedal such as pedal 40.

Of course, it will be understood by persons of ordinary skill in the art that a rocking pedal movement could be designed to occur on an axis other than axis a3 or a4 as described above.

Further, persons of ordinary skill in the art will appreciate that the control which can be achieved with an actuator which comprises any one of the rocking foot pedals described above can be emulated in a variety of ways. The use of one's foot is not necessarily required. For example, a suitable actuator may have a pivotal or linear movement emulating a pivotal movement designed for control by hand rather than by foot. The prior art is replete with devices for detecting movement and for measuring the amount of movement.

Referring now to FIG. 7, there is illustrated a power control system for a vehicle having an electric drive, the electric drive comprising a battery power source 70, a motor controller 71, and an electric motor 73 for providing motive power to wheels or at least one wheel 13 of the vehicle. The system comprises a power control actuator 75 comprising a rocking foot pedal 30 as shown in FIGS. 3 and 4, and a pedal rotation sensor 76. Further, the system comprises a speed sensor 77 and a speed holder 78.

It will be understood by persons of ordinary skill in the art that a rocking foot pedal such as foot pedal 40 could be substituted in FIG. 7 for pedal 30 to generally achieve the same function or similar control as that provided by pedal 30.

Speed holder 78 receives two input signals, the first being a power control signal from power actuator 75 via the output of pedal rotation sensor 76, the second being a speed signal from speed sensor 77 corresponding to the measured speed of the vehicle. In response, the speed holder (which, for example, may comprise an operational amplifier) produces as an output signal a modified power control signal for motor controller 71, the modified signal having a variable value dependent on the difference between the two input signals.

Referring now to FIG. 8, there is illustrated a speed control system for a vehicle having an electric drive, the electric drive comprising a battery power source 80, a motor controller 81, and a D.C. electric motor 82 for providing motive power to wheels 13 of the vehicle. The system comprises a speed changing control actuator 90 comprising a rocking foot pedal 30 as shown in FIGS. 3 and 4, a rotary potentiometer 91, and a buffer amplifier 95. Further, the system comprises a speed sensor 96, a speed holder 97, a switched augmenting integrator 100 which includes an integrator resetter 101, and a braking actuator 110.

Since actuator 90 of the present embodiment serves to control speed rather than power, it is referred to herein as a speed changing control actuator rather than as a power control actuator. However, as will be understood by persons of ordinary skill in the art, actuator 90 as depicted in FIG. 8 may readily be regarded from a structural point of view as a species of actuator 75 as depicted in FIG. 7. Further, it will be understood that this species is merely an example.

In further regard to actuator 90, and as in the case of the embodiment shown in FIG. 7, it will be understood by persons of ordinary skill in the art that a rocking foot pedal such as foot pedal 40 could be substituted in FIG. 8 for pedal 30 to generally achieve the same function as that provided by pedal 30.

In more detail, rotary potentiometer 91 of actuator 90 is mounted with pedal 30 on shaft 31 and includes two terminals; firstly, terminal 92 normally wired to a positive DC voltage source and, secondly, terminal 92 normally wired to a negative DC voltage source. The positive and negative sources are of equal magnitude whereby the voltage on line 94 at the output of the potentiometer is zero when pedal 30 is in its neutral position. This output is also the input to buffer amplifier 95 which in the present embodiment is an operational amplifier wired as a voltage follower. Together, potentiometer 91 and amplifier 95 may be considered as part of a pedal rotation sensor.

As shown in FIG. 8, braking actuator 110 comprises a conventional brake pedal 111 (which has associated conventional mechanical components not shown) and also a brake application sensor 112 for producing braking signals upon a driver's activation of the brake pedal. One braking signal from the brake application sensor is provided as a reset signal on line 115 to switched augmenting integrator 100; another as a signal on line 113 to motor controller 81. The input to brake application sensor 112 from pedal 111 may be a simple voltage generated when pedal 111 moves to close a switch, (generally similar to conventional cruise control or brake-light systems). Although not shown, it of course will be understood that brake pedal 111 is connected to the vehicle brakes as well as brake application sensor 112.

Switched augmenting integrator 100 receives a proportionate actuator displacement signal from speed changing control actuator 90 and adds to it the time integral of that signal to provide a signal to operatively connected speed holder 97. It also receives a signal from integrator resetter 101 to adjust its output to correspond to any post-braking speed. In more detail, switched augmenting integrator 100 comprises operational amplifier $OA_1$, capacitor $C_1$, resistors $R_1$ and $R_2$, and triple-pole double-throw switch $SW_1$. One end of resistor $R_1$ is connected to the output of buffer amplifier 95 of speed changing control actuator 90; the other to an input of amplifier $OA_1$.

The switch position shown in FIG. 8 is a BRAKE OFF position where capacitor $C_1$ and resistor $R_2$ are connected by switch $SW_1$ in series in a feedback loop around amplifier $OA_1$ from the output of amplifier $OA_1$. This is the normal (viz. unactivated) position of switch $SW_1$. In this position, the relationship between the output voltage $v_2$ of amplifier $OA_1$ and the input voltage $v_1$ from the output of buffer amplifier 95 as a function of time (t) can be simply expressed as follows:

$$v_2(t) = -(R_2/R_1)v_1(t) - (1/C_1 R_2)\int_0^t v_1(t)\,dt + v_1(0)$$

If the vehicle is starting from rest, then $v_1(0)$ will be zero.

When switch $SW_1$ is activated by a reset signal from braking actuator 110, then the switch toggles and capacitor $C_1$ and resistor $R_2$ are removed from the feedback loop of amplifier $OA_1$. A zero resistance/impedance appears in the feedback path around $OA_1$. Fundamentally $OA_1$ is now wired as a voltage follower. This is a BRAKE ON position and results when coil 116 of switch $SW_1$ receives an energizing reset signal on line 115 from brake 111 via brake application sensor 112. In this switch position, the output on line 98 from speed sensor 96 becomes effective. The voltage across capacitor $C_1$ will drive towards the voltage output from speed sensor 96. Meanwhile, on line 113, brake application sensor 112 signals motor controller 81 to provide neither positive or negative energy to motor 82.

When brake 111 is released and the reset signal from braking actuator 110 ends, $SW_1$ becomes deactivated. Capacitor $C_1$ and resistor $R_2$ will be once again in the feedback loop of amplifier $OA_1$. The resulting initial voltage input to speed holder 97 from $OA_1$ will depend upon the voltage across capacitor $C_1$ at the time the reset signal from braking actuator 110 was terminated.

Speed sensor 96 provides a signal proportional to the vehicle's measured speed. One of its two outputs is provided as an input to integrator resetter 101 on line 98; the other to speed holder 97 on line 99.

Speed holder 97 is operatively connected to the output of switched augmenting integrator 100, speed sensor 96, and motor controller 81. Its output depends upon the difference between the inputs received from the outputs of integrator 100 and speed sensor 96.

More particularly, using the speed signal from speed sensor 96, speed holder 97 signals motor controller 81 to provide positive or negative energy to D.C. electric motor 82 to or from battery 80 so as to maintain a constant speed signal in proportion to the speed holder's setting. That setting matches and tracks the output of integrator 100. Speed holder 97 may be an operational amplifier used as a voltage follower in which motor controller 81, electric motor 82, vehicle wheels 13 and speed sensor 96 constitute a chain in its feedback loop.

As indicated above, the switched augmenting integrator shown in FIG. 8 includes a triple-pole double-throw switch $SW_1$ which has BRAKE ON and BRAKE OFF positions. The position will be determined by the presence or absence of a reset signal on line 115 from brake application sensor 112. If there is no reset signal from the brake application sensor, then the signal will correspond to a BRAKE OFF signal. If there is a reset signal, then the signal will correspond to a BRAKE ON signal.

When the system shown in FIG. 8 is in use, motor controller 81 is operatively connected to speed holder 97, battery 80, and D.C. electric motor 82. Motor controller 81 responds proportionally to the output of speed holder 97 by regulating the energy flow in either direction between battery 80 and electric motor 82. Regenerative braking occurs when the motor controller causes energy to flow from the motor to the battery. Motor controller 81 is also operatively connected along line 113 to brake application sensor 112 of braking actuator 110 whose braking signal causes the motor controller to reduce motor energy flow to zero whenever, and so long as, brake pedal 111 is pressed.

Electric motor 82 is operatively connected to motor controller 81 and drive wheels 13. It causes energy to flow from battery 80 to the drive wheels and vice versa, according to its input from the motor controller.

In preferred embodiments, the system illustrated in FIG. 8 functions as follows when in use:

Starting from rest, the driver applies toe pressure to pedal 30 thereby causing a positive displacement from its neutral or default position. This produces a positive output from actuator 90 proportional to the degree of displacement. Fed to switched augmenting integrator 100 as an input, this output immediately results in a corresponding time dependent output that passes to speed holder 97 which is thereby "set" and compares this set signal to the speed signal from speed sensor 96, which will be zero if the vehicle has not yet started to move. Based on the comparison, the speed holder signals the motor controller to cause a proportionate energy flow from battery 80 to motor 82 and thence to vehicle wheels 13.

The vehicle accelerates causing speed sensor 96 to generate an increasing signal that is fed to speed holder 97. The feedback loop is closed (in the absence of a brake signal) and the vehicle's speed increases until the comparison reduces so that the flow of energy from battery 80 balances frictional, drag, and gravitational forces acting on the vehicle. However, the speed at which the comparison goes to zero is influenced by any change in the signal received from switched augmenting integrator 100 and this depends on the driver's pressure on pedal 30. If the driver immediately removes his or her foot, the output of integrator 100 will stay constant because of the absence of any time over which to integrate. If the driver maintains constant toe pressure, and therefore constant displacement of pedal 30, then the output of integrator 100 will not return to zero but will, instead, gradually increase as the integral of the displacement signal increases over time. The vehicle will gradually accelerate and continue to do so to the limits of the system. To counter this, a driver typically will intuitively gradually relax foot pressure and the vehicle will ease into a constant speed, maintained by speed holder 97, once the foot has been removed from the pedal. If the driver now applies heel pressure, the speed setting signal fed to speed holder 97 will decline. Eventually, motor controller 81 may be called upon to begin regenerative braking to the point of zero speed. If the driver continues to apply heel pressure, the set signal will be or will become negative and the vehicle will eventually begin travelling backwards. This characteristic reflects another advantage of the present invention. In addition to obviating the need for separate speed holding buttons for cruise control, it renders unnecessary a separate control for driving in reverse.

When brake pedal 111 is applied, a braking signal is generated and fed to motor controller 81 causing it to interrupt energy flow between battery 80 and drive wheels 13. Such braking as now takes place is mechanical and non-regenerative. The integrator 100 is switched so that its output, governed by the speed signal from speed sensor 96, declines to a value equal to whatever corresponds to the current speed. Consequently, when the driver removes his or her foot from brake pedal 111, there is a new set speed such that the vehicle's speed is now held at the post-braking speed. The means by which this may be achieved is illustrated by the embodiment shown in FIG. 8.

If an A.C. motor was employed instead of D.C. motor 82 shown in FIG. 8, then it will be understood by persons of ordinary skill in the art that speed holder 97 as shown in FIG. 8 and its connection (line 99) from speed sensor 96 can be excluded. Necessarily, the connection from amplifier OA1 to speed holder 97 will instead extend as an input to motor controller 81

Various modifications and changes to the embodiments shown in the drawings are possible and undoubtedly will occur to persons of ordinary skill in the art.

I claim:

1. A power control system for a vehicle having wheels and an electric drive with regenerative braking, said electric drive comprising an electric motor for providing motive power to at least one of said wheels and an electric motor controller for controlling the motor, said system including:
   (a) a motive power control actuator which is biased to a neutral position, and which is controllably moveable between opposed positive and negative power control positions relative to said neutral position for producing a motive power control signal ranging from a value corresponding to zero power when in said neutral position to a variable value dependent on the amount of such movement from said neutral position;
   (b) a speed sensor for providing a speed signal corresponding to a measured speed of said vehicle; and,
   (c) a speed holder operably connected to said power control actuator and to said speed sensor for:
      (i) receiving a signal corresponding to said motive power control signal as a first input signal;
      (ii) receiving a signal corresponding to said speed signal as a second input signal; and,
      (iii) producing as an output signal a modified power control signal for said motor controller, the modified signal having a variable value dependent on the difference between said first and second input signals.

2. A power control system as defined in claim 1 wherein, said motive power control actuator comprises a rocking foot pedal and a pedal rotation sensor:
   said pedal being rotationally biased to said neutral position relative to a pivot axis and being pivotable against said bias both clockwise and anticlockwise about said axis from said neutral position to a desired positive or negative power control position; and,
   said rotation sensor being operatively connected to said pedal for producing said motive power control signal.

3. A power control system as defined in claim 2, said axis extending transverse to a longitudinal axis of said pedal and horizontally relative to a floor of said vehicle.

4. A power control system as defined in claim 2, said axis extending transverse to a longitudinal axis of said pedal and upwardly and forwardly relative to a floor of said vehicle.

5. A vehicle speed control system for a vehicle having wheels and an electric drive with regenerative braking, the electric drive comprising an electric motor for providing motive power to at least one of said wheels, an electric motor controller for controlling the motor, and a power source, said system comprising:
   (a) a speed changing control actuator biased to a neutral position and controllably moveable between opposed positive and negative control positions relative to said neutral position for producing a speed changing control signal having a variable value dependent on the direction and on the degree of such movement from said neutral position;
   (b) a braking actuator for producing a braking signal;
   (c) a resettable integrator operably connected to said control actuator for receiving an input signal corresponding to said speed changing control signal and, in the absence of said braking signal, for providing an output signal related to said input signal and the time integral of said input signal;
   (d) an integrator resetting for resetting the integrator in response to said braking signal; and,
   (e) a speed sensor for providing a measured vehicle speed signal to said integrator.

6. A vehicle speed control system as defined in claim 5, wherein said integrator is a switched augmenting integrator, said integrator resetter forming a part thereof.

7. A vehicle speed control system as defined in claim 5 or 6, wherein the electric motor is a D.C. electric motor and wherein the system further comprises a speed holder operably connected to the output of the integrator and to the output of the speed sensor for providing a difference signal to said motor controller, said difference signal corresponding to the difference between said output signal from said integrator and said speed signal from said speed sensor.

8. A vehicle speed control system as defined in claim 5 wherein, said speed changing control actuator comprises a rocking foot pedal and a pedal rotation sensor:
   said pedal being rotationally biased to said neutral position relative to a pivot axis and being pivotable against said bias both clockwise and anticlockwise about said axis from said neutral position to a desired position.

9. A vehicle speed control system as defined in claim 8, said axis extending transverse to a longitudinal axis of said pedal and horizontally relative to a floor of said vehicle.

10. A vehicle speed control system as defined in claim 8, said axis extending transverse to a longitudinal axis of said pedal and upwardly and forwardly relative to a floor of said vehicle.

* * * * *